July 22, 1924.
J. JOULE
1,502,473
VALVE
Filed April 13, 1922
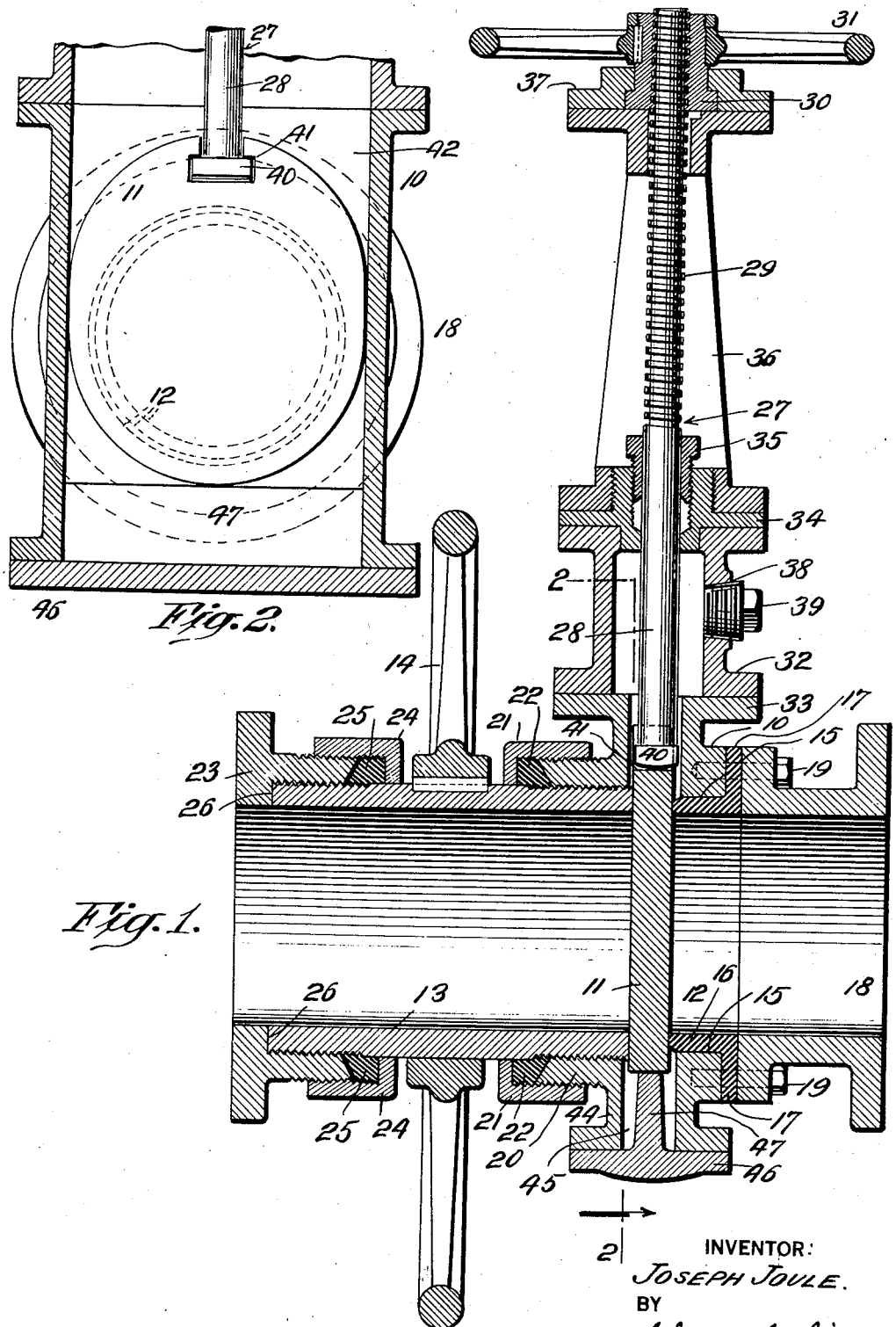
INVENTOR:
JOSEPH JOULE.
BY
Charles C. Gill,
ATTORNEY Patented July 22, 1924.

1,502,473

UNITED STATES PATENT OFFICE.

JOSEPH JOULE, OF BELLEVILLE, NEW JERSEY, ASSIGNOR TO EASTWOOD WIRE MANUFACTURING COMPANY, OF BELLEVILLE, NEW JERSEY, A CORPORATION OF NEW JERSEY.

VALVE.

Application filed April 13, 1922. Serial No. 552,165.

*To all whom it may concern:*

Be it known that I, JOSEPH JOULE, a citizen of the United States, and a resident of Belleville, in the county of Essex and State of New Jersey, have invented certain new and useful Improvements in Valves, of which the following is a specification.

The invention relates more particularly to improvements in valves for digesters and other apparatus employed in connection with the manufacture or preparation of wood pulp for paper making; and it consists in the novel features hereinafter described and claimed.

The object of my invention is to produce an efficient and durable straight-way blow-off valve for use in the paper-making art and one having special means for binding the valve gate when in its closed position, firmly against its seat.

The valve of my invention comprises a general valve casing, a gate-valve therein, a removable valve-seat at one side of said gate-valve, an adjustable tubular or pipe section at the other side of said gate-valve having manually operative means for its adjustment toward and against said gate-valve, and suitable flanged members for positioning said valve-seat and said tubular section and serving as means for enabling the connection of the general structure in a pipe line.

The invention will be fully understood from the detailed description hereinafter presented, reference being had to the accompanying drawings, in which:

Fig. 1 is a central vertical longitudinal section through a valve, and its parts, constructed in accordance with and embodying the invention, and Fig. 2 is a vertical transverse section, partly broken away, of the same, taken on the dotted line 2—2 of Fig. 1.

In the drawings, 10 designates the main body portion of the valve casing, 11 the gate-valve mounted therein, 12 a valve-seat at one side of said gate-valve, and 13 a tubular or pipe section at the other side of said gate-valve and adapted to be forced against the same for binding said valve, when in closed position, against said seat, said tubular section 13 having a threaded connection with the valve-casing and being provided with a hand-wheel 14 by means of which said section may be turned and thereby, due to its threaded connection with the valve-casing, caused to move toward or from said valve.

The main casing 10 at the inlet side of the valve 11, has a plain circular opening 15 into which is closely fitted the circular member 16 of the valve seat 12, said valve seat being of right angle shape in cross-section and composed of said circular member affording at its inner edge the valve-seat proper and a flange member 17 fitting against the casing 10 at said opening 15 therein and being secured thereto by a flanged coupling or union member 18 and bolts 19, which extend through a flange of said member 18 and the flange 17 and enter threaded sockets in the casing 10 and thereby connect the member 18 with the casing 10 as a connected part thereof and properly secure the valve-seat in position. The outer end of the member 18 is flanged to facilitate the connection of the valve-casing in a pipe line.

At the outlet side of the valve 11, the casing 10 is formed with the internally and externally threaded circular neck 20 into which the inner externally threaded end of the tubular or pipe section 13 is screwed and upon which is screwed a right-angle gland flange 21 confining a packing material 22 against the inwardly beveled outer edge of the neck 20 and the adjacent outer surface of the tubular section 13.

Upon the outer threaded end of the tubular section 13 is screwed an internally and externally flanged coupling or union member 23 upon the inner end portion of which is screwed a right-angle gland flange 24 confining a packing material 25 against the inwardly beveled edge of the member 23 and the outer surface of the tubular section 13. The outer end of the coupling member 23 is flanged inwardly to provide an annular shoulder 26 to engage the outer end of the tubular section 13 and outwardly to provide facilities for connecting the valve structure in a pipe line or the like. The packings 22, 25 render the joints between the tubular section 13 and the neck 20 and coupling member 23 liquid-tight.

The valve 11 is a flat plate adapted to open or close the passage through the valve structure and is connected with the lower end of a valve stem or operating rod 27 whose inner end portion 28 has a smooth surface and whose outer end portion 29 is screw-threaded and entered within a nut 30 equipped with an operating wheel 31 of customary type. The valve rod 27 extends upwardly through a hollow section 32 secured upon a flange 33 forming a part of the valve casing and supports on its upper flanged end an internally and externally threaded member 34 which, together with a threaded member 35, constitutes a gland which will contain suitable packing material and therewith form around the valve stem or rod 27 a liquid-tight joint. Upon the member 34 is mounted a yoke 36 of usual type through which the vlave stem or rod 27 passes and upon whose flanged upper end is secured a housing 37 for the nut 30. The tubular member 32 is equipped in its side with an opening 38 and a plug 39 therefor, and said member 32 not only supports the features above it but provides means whereby the interior of the valve may be blown-off or cleaned out.

The lower end of the valve stem or rod 27 is formed with a cross-head 40 which seats within a conforming recess 41 in the upper end of the valve 11, said head and recess affording means for detachably connecting the rod 27 and valve 11 together, so that the valve may be raised and lowered when moved to open and closed position with the use of said rod, whose rotation in one direction or the other will effect the sliding movement of the valve 11.

At its transverse portion, about the valve 11, the body casing 10 is of rectangular formation, as shown in Fig. 2, forming a vertical guide-way 42 confining the valve 11 at its opposite faces and side edges and serving to direct the valve during its reciprocating movements and properly position said valve with respect to the passage through the valve structure.

At the bottom of the guide-way 42 the valve-casing has, below the valve 11, a flanged neck 44 defining an opening 45 which is normally closed by a bottom flange or cap 46, which is removable and carries a vertical plate 47 extending upwardly into the opening 45 and serving, at its upper edge, as a seat or stop for the lower end of the valve 11, as shown, said plate arresting said valve 11 when the same has been moved downwardly to its closed position. The opening 45 and removable flange or cap 46 are provided as means for facilitating the cleaning out, when necessary, of the valve structure.

In the valve hereinbefore described, all of the metal parts thereof, with the exception of the yoke 36, flange 30, hand wheel 31 and hand wheel 14, will preferably be formed of bronze so as to be capable of resisting the action of the acid contained in the pulp or other material flowing through the valve structure.

The valve structure of my invention therefore comprises, among its principal parts, the body casting 10, of the character disclosed, having the ring valve-seat 12, slide or gate-valve 11 and, at the outlet side of the structure, the threaded tubular section 13 equipped with the hand-wheel 14 and adapted to be moved firmly against the valve 11. The details of the structure are also of importance, as will be understood without particular comment.

The method of employing the valve will be readily understood without extended explanation. When the valve 11 is in the position shown in the drawings, it closes the passage through the valve structure, and at this time the valve 11 will be seated on the flange or plate 47 and may be locked against the ring valve-seat 12 by means of the tubular section 13. When the valve 11 is, by means of the rod or screw 27, moved to its outer position, said valve will pass into the chambered section 32 mounted on the casing 10 and clear the passage-way through the valve structure, and the flow of the material may then take place through the valve structure without interruption. When the ring valve-seat 12 becomes unduly worn, it may be replaced by a new ring seat, and at all times the tubular or pipe section 13 may be adjusted toward and against the valve 11 either to lock said valve in closed position or take up wear thereon. The inner edge of the valve-seat ring 12 projects into the slide-way 42 for the valve 11 so as to be properly engaged by the valve, and the inner end of the tubular or pipe section 13 may also project slightly into the guide-way 42. The inner end of the tubular section 13 covers or lines the inner surface of the body casing 10 at one side of the gate-valve and the horizontal member 16 of the valve-seat covers or lines the inner surface of the body casing at the other side of the gate-valve, and said section 13 and said member 16 have corresponding inner diameters and mainly form the straight-way passage through the valve structure.

The invention is not limited to all of the details of form and construction shown and described, because many of these features may be modified without departure from the spirit of my invention as claimed.

What I claim as my invention and desire to secure by Letters Patent, is:

1. A valve-structure of the character described comprising a body-casing containing a through passage and having a transverse guide-way for a gate-valve therefor, a plate gate-valve in said guide-way, means for operating the valve comprising a threaded stem articulated to the upper end of the plate and means for effecting vertical movement of the stem, a ring valve-seat at one side of said gate-valve and a tubular pipe section at the other side of said gate-valve and having a threaded connection with said body-casing and having exterior thereto an exposed surface to which manually operative means are applied for rotating said pipe section, said pipe section being extended laterally beyond said body-casing.

2. A valve structure of the character described comprising a body-casing containing a through passage and having a transverse guide-way for a gate-valve therefor, said casing being formed at one side of said guide way with an internally and externally threaded neck, a plate gate-valve in said guide-way, means for operating the valve, a ring valve-seat at one side of said gate-valve, a rotary tubular pipe section at the other side of said gate valve screwed at one end into said threaded neck and adjustable toward and against said valve, and a right-angle gland member encompassing said pipe section and screwed upon said neck and confining a packing against the end of said neck and adjacent surfaces of said pipe section, said pipe section being extended laterally beyond said body-casing and having rigidly applied means on an exposed surface for rotating said section.

3. A valve-structure of the character described comprising a body-casing containing a through passage and having a transverse guide-way for a gate-valve therefor, a plate gate-valve in said guide-way, means for operating the valve comprising a threaded stem articulated to the upper end of the plate and means for effecting direct vertical movement of said stem, a ring valve-seat at one side of said gate-valve and a tubular rotary pipe section at the other side of said gate-valve and having a threaded connection with said body-casing and provided with means on an exposed portion laterally beyond the casing for adjusting it with relation to said valve, said casing being formed with a transverse clean-out opening at the bottom of said guide-way and provided with a flange or cap normally closing said opening and having an upwardly extending member to form a stop for said valve when the same reaches its closed position.

4. A valve structure of the character described comprising a body-casing containing a through passage and having a transverse guide-way for a gate-valve therefor, said casing being formed at one side of said guide-way with an internally and externally threaded neck, a plate gate-valve in said guide-way, means for operating the valve, a ring valve-seat at one side of said gate-valve, a rotary tubular pipe section at the other side of said gate valve screwed at one end into said threaded neck and adjustable toward and against said valve, said pipe section extending laterally beyond said body-casing and having means rigidly applied on an exposed surface of the section exterior to said casing for its manual rotation, a right-angle gland member encompassing said pipe section and screwed upon said neck and confining a packing against the end of said neck and adjacent surfaces of said pipe section, an internally and externally threaded coupling member screwed upon the outer end of said pipe section and having an inwardly extending annular portion engaging a face of the outer end of said pipe section and a right-angle gland member encompassing said pipe section and screwed upon said coupling member and confining a packing material against the inner end of said coupling member and adjacent surfaces of said pipe section.

5. A valve-structure of the character described comprising a body-casing containing a through passage and having a transverse guide-way for a gate-valve therefor, a plate gate-valve in said guide-way, means for operating the valve, a ring valve-seat at one side of said gate-valve and a rotary tubular pipe section at the other side of said gate-valve and entered within and having a threaded connection with said body-casing and provided exterior of the body-casing with a hand-wheel for adjusting it toward and against said valve, said ring valve seat being entered within one end of said body-casing and covering the inner surface thereof and defining the said passage at one side of said valve, and said pipe section having an inner diameter corresponding with that of said ring valve-seat and defining said passage at the other side of said valve and extending laterally beyond said body-casing and having means for coupling it in a pipe line.

6. A valve-structure of the character described comprising a body-casing containing a through passage and having a transverse guide-way for a gate-valve therefor, a plate gate-valve in said guide-way, means for operating the valve comprising a threaded stem articulated to the upper end of the plate and means for effecting direct vertical movement of said stem, a ring valve-seat at one side of said gate-valve and a rotary tubular pipe section at the other side of said gate-valve and entered within and having a threaded connection with said body-casing and provided exterior of the body-casing with a rigidly applied hand-wheel for rotating said pipe section and thereby adjusting it toward and against said valve.

Signed at Belleville, in the county of Essex and State of New Jersey, this 16th day of March, A. D. 1922.

JOSEPH JOULE.